May 22, 1928.
O. MENDENHALL
POULTRY FEEDER
Filed June 30, 1924
1,671,041
Fig.1.
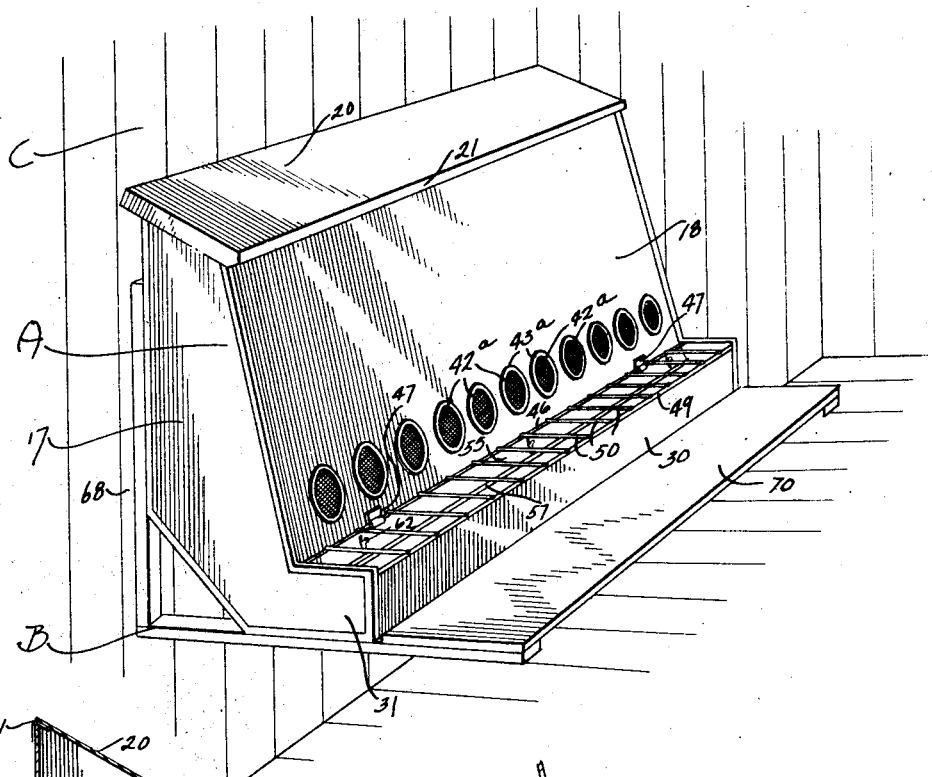
Fig.2.
Fig.3.
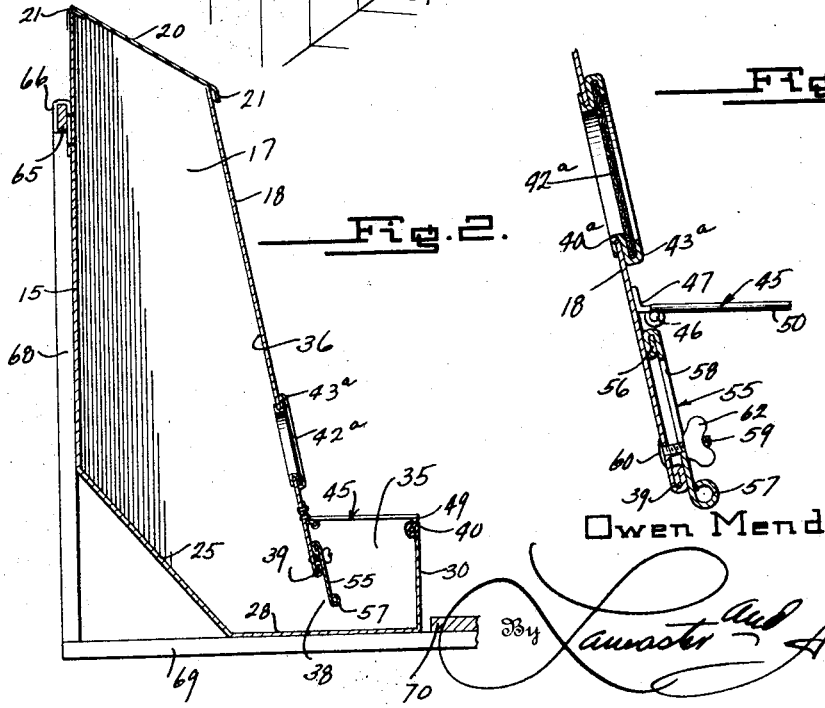
Inventor
Owen Mendenhall
By Lancaster and Allwine
Attorneys Patented May 22, 1928.

1,671,041

UNITED STATES PATENT OFFICE.

OWEN MENDENHALL, OF RUSSIAVILLE, INDIANA.

POULTRY FEEDER.

Application filed June 30, 1924. Serial No. 723,322.

This invention relates to improvements in poultry feeders.

The primary object of this invention is the provision of a poultry feeder which is relatively simple in construction, which will properly feed mash or other food therein to a trough portion thereof in an efficient manner, and in proper quantity.

A further object of this invention is the provision of a feeder or hopper for poultry specially constructed with a novel food regulator for a trough portion thereof by means of which a proper quantity of food will be allowed to pass into the trough.

A further object of this invention is the provision of a relatively simple and compact type of feeder embodying novel means by which mash or other food substance therein will be readily fed into a trough portion thereof at all times, including means by which the poultry, or stock, will themselves assist in preventing any clogging of food within the hopper.

Other objects and advantages of this invention will be apparent during the course of the following detailed description:

In the accompanying drawing, forming a part of this specification, and wherein similar reference characters designate corresponding parts throughout the several views, Figure 1 is a perspective view showing the manner in which the improved feeder is supported upon a wall in elevated relation above a ground floor.

Figure 2 is a cross sectional view taken through the improved feeder in its supported relation, and Figure 3 is an enlarged sectional view of certain novel features of this invention.

In the drawing, wherein for the purpose of illustration is shown only a preferred embodiment of the invention, the letter A may generally designate the improved feeder which is adapted for cooperation with a supporting rack B, upon a wall C of a building.

Referring to details of the feeder A, the same is preferably constructed of sheet metal, suitably galvanized or otherwise rendered rust-proof and non-corroding, and the same includes a rear wall 15; end walls 17; a front wall 18 connected in fixed relation with the rear wall 15 by means of the end walls 17, and so that the rear and front walls 15 and 18 respectively are disposed in a diverging relation from the top of the feeder downwardly. At the top of the feeder a closure 20 is hingedly connected at 21, adjacent the top edge of the rear wall 15, including forward and side depending flanges 21 adapted to overlap outwardly of the front and side walls. The upper edge of the rear wall 15 extends considerably above the upper edge of the front wall 18, and the upper edges of the end walls 17 are suitably inclined so that the closure 20 rests upon an incline to the horizontal when the hopper or feeder is in position with the rear wall 15 vertically disposed. With the top wall 20 so sloping, roosting of poultry on the hopper is prevented, and any foreign materials may fall from the closure, and it will always assume a closed position incident to gravity thereof. A diagonally disposed bottom wall portion 25 is provided, preferably bent from the rear wall 15 at an obtuse angle thereto, and this bottom wall portion 25 extends downwardly and at its lower edge is spaced just rearwardly of the bottom edge of the front wall 18. A second bottom wall portion 28 is also provided, preferably integral with the wall portion 25, and which wall portion 28 is horizontally disposed when the feeder is in position, and of course disposed in a plane at an obtuse angle with respect to the wall 25. The wall portion 28 extends forwardly of the lower edge of the front wall 18, and is bent upwardly at 30, outwardly of the front wall. The lower portions of the end walls 17 are forwardly extended, at 31, for cooperation with the bottom wall portion 28 and trough flange or front wall 30, in order to provide a trough 35 adapted to receive feed as it passes downwardly through a compartment 36 of the feeder, and through the opening 38 between the lower edge of the front wall 18 and the plane of the bottom wall portion 28. All jointed connections of the wall portions of the feeder housing above described are preferably constructed as double seamed joints, and it is preferred that the lower edge 39 of the front wall 18 be rolled to prevent any possible injury to poultry. The upper edge of the trough wall 30 is also rolled, at 40, to similarly prevent injury to poultry, and this roll 40 is disposed inwardly of the trough 35 to prevent slopping of feed outwardly over the trough edges.

In order to insure regular feeding, a stall or rack closure 45 is provided for disposition over the trough, which includes a bar 46 hingedly connected by straps 47 longitudinally on a feeder housing, upon the front wall 18 just upwardly of the lower rolled edge 39 thereof. A front bar 49 is also provided for resting relation upon the rolled edge 40 of the trough wall 30, and suitable cross bars 50 are electric welded or otherwise suitably attached in connected relation with the longitudinally extending bars 46 and 49; these cross bars 50 being in an evenly spaced parallel relation to give sufficient room for the insertion of the head of one chicken therein.

A novel type of regulator member 55 is provided for adjustment across the opening 38 which communicates the trough 35 with the compartment 36, to regulate the quantity of food which may pass through the opening 38 into the trough, and which will also regulate the level of the food in the trough, so that there can be no slopping of the same over the trough walls. This closure member 55 is preferably formed of sheet metal, at its upper end 56 being rolled inwardly and at its lower end 57 having a relatively large cylindrical roll outwardly of the body portion thereof. This regulator member 55 is provided with transverse slots 58 therein through which the screw threaded shanks 59 of bolts 60 extend; the latter being carried by the housing wall 18 just upwardly of the lower rolled portion 39, and said screw threaded shanks 59 being adapted to receive wing nuts 62 or analogous elements thereon for binding relation against the body of the regulator member 55, whereby to space the lower rolled edge 57 thereof any suitable distance above the feeder bottom 28.

As in some instances the feed may stick in the hopper, it is preferred to provide novel preventative means adjacent each stall or preferably between each of the cross bars 50 of the closure, in the front wall 18. To this end openings 40$^a$ are provided in the housing wall 18, and flexible wire mesh screening 42$^a$ supported outwardly thereof by means of substantially ring shaped sheet metal portions 43$^a$, which are S-shaped in cross section, to provide suitable flanges for crimping through the opening 40$^a$ and to receive the inner edges of the screening 42$^a$ therein.

The supporting rack B may include a top rail 65 over which a U-shaped bracket 66 may be hooked; the latter being secured as by riveting the outer surface of the rear wall 15 of the hopper housing. The vertical brace pieces 68 are provided, at the lower ends of which horizontal supporting pieces 69 are secured. A feeding platform 70 is supported at the outer ends of the horizontal pieces 69. In assembled relation the feeder is hooked over the rail 65, and as the feeding platform 70 is supported above a ground surface it can be readily understood that it will be necessary for the poultry to jump upwardly thereon in order to feed out of the trough of the hopper. The front wall 30 of the hopper trough comes only to the rear edge of the feeding platform 70, so that the poultry stand upon the platform 70 in order to feed out of the trough. If the feed becomes stuck in the hopper compartment 36, it will be loosened from time to time by the pecking of the poultry against the wire mesh screening 42$^a$, in their endeavor to pick visible particles through said screening. The feeding will take place out of the trough 35, and only sufficient feed will be permitted to pass therein by proper regulation of the member 55, according to the consistency or nature of the mash or food.

From the foregoing description of this invention it is apparent that a novel type of feeder has been provided which will permit efficient feeding by poultry, and the features of this feeder may also be used in connection with the feeding of live stock, if so desired.

Various changes in the shape, size, and arrangement of parts may be made to the form of invention herein shown and described, without departing from the spirit of this invention or the scope of the claims.

I claim:

1. In a feeder of the class described a supporting rack providing a vertical wall attaching portion, horizontal supporting arms and a platform which may be supported in elevated relation above a floor surface, a housing providing a storage compartment therein and including a trough way in communication with the storage compartment through an opening at the lower portion of said housing and means supporting the housing upon the vertical wall attaching portion in resting relation on the supporting arms so that the platform is disposed outwardly of said trough way.

2. In a feeder of the class described the combination of a supporting rack comprising a top rail having depending vertical brace portions, the brace portions at the lower ends thereof having horizontal brace portions which at their free ends support a transverse horizontally disposed platform, a housing having a storage compartment therein and including a trough way in communication with the storage compartment thru an opening at the lower portion of said housing, said housing including a rear wall, and hooks on the rear wall adapted for detachable hooking over the top rail of the supporting rack to support the housing on the supporting rack and in resting relation on the horizontal braces of the rack, the housing in depth being such that the trough is disposed just rearwardly of the platform to permit poultry to perch on the platform for feeding in said trough.

OWEN MENDENHALL.